United States Patent
Papancea et al.

(10) Patent No.: US 11,687,737 B2
(45) Date of Patent: *Jun. 27, 2023

(54) METHOD FOR MULTI-CHANNEL AUDIO SYNCHRONIZATION FOR TASK AUTOMATION

(71) Applicant: NLX Inc., New York, NY (US)

(72) Inventors: Andrei Papancea, New York, NY (US); Vlad Papancea, New York, NY (US)

(73) Assignee: NLX Inc., New York, NY (US)

(\*) Notice: Subject to any disclaimer, the term of this patent is extended or adjusted under 35 U.S.C. 154(b) by 0 days.

This patent is subject to a terminal disclaimer.

(21) Appl. No.: 17/932,162

(22) Filed: Sep. 14, 2022

(65) Prior Publication Data

US 2023/0004731 A1 Jan. 5, 2023

Related U.S. Application Data

(63) Continuation of application No. 17/532,662, filed on Nov. 22, 2021, now Pat. No. 11,461,562.

(Continued)

(51) Int. Cl.
*G06F 40/58* (2020.01)
*G10L 15/00* (2013.01)
*H04L 67/12* (2022.01)

(52) U.S. Cl.
CPC ............ *G06F 40/58* (2020.01); *G10L 15/005* (2013.01); *H04L 67/12* (2013.01)

(58) Field of Classification Search
CPC ....... G06F 40/58; G06F 3/167; G10L 15/005; H04L 67/12; H04M 3/5133; H04M 2201/22; H04M 3/5183; G06Q 30/016
See application file for complete search history.

(56) References Cited

U.S. PATENT DOCUMENTS

| | | |
|---|---|---|
| 5,892,813 A | 4/1999 | Morin et al. |
| 8,983,383 B1 | 3/2015 | Haskin |

(Continued)

FOREIGN PATENT DOCUMENTS

| | | |
|---|---|---|
| WO | WO-2019236120 A1 | 12/2019 |
| WO | WO-2022109149 A1 | 5/2022 |

OTHER PUBLICATIONS

CallVU, CallVU Visual IVR—Banking, [Online], Screenshots, Retrieved from the Internet: https://www.youtube.com/watch?v=94llhLCNbZ0, Sep. 2020, 2 pages.

(Continued)

*Primary Examiner* — Jesse S Pullias
(74) *Attorney, Agent, or Firm* — Cooley LLP

(57) ABSTRACT

A method for coordinating actions between an audio channel and a synchronized non-audio channel includes receiving an indication of a start of a session associated with a user and having an audio channel that is synchronized with a non-audio channel. Thereafter, repeated determinations are made as to whether a prompt on the non-audio channel has been received from the user. In response to each determination that the prompt on the non-audio channel has not been received from the user, a signal is sent to cause an inaudible output on the audio channel to the user. In response to a determination that the prompt on the non-audio channel has been received from the user, an audible output is selected based on an activity by the user on the non-audio channel, and a signal is sent to cause the audible output to be output on the audio channel.

20 Claims, 5 Drawing Sheets

Related U.S. Application Data

(60) Provisional application No. 63/116,952, filed on Nov. 23, 2020.

(56) References Cited

U.S. PATENT DOCUMENTS

| | | | |
|---|---|---|---|
| 9,955,205 | B2 | 4/2018 | Covell et al. |
| 9,961,120 | B2 | 5/2018 | Krishnan et al. |
| 10,051,131 | B2 | 8/2018 | Saylor et al. |
| 10,469,664 | B2 | 11/2019 | Pirat et al. |
| 10,484,539 | B2 | 11/2019 | Kumar et al. |
| 10,523,816 | B1 | 12/2019 | Neuer, III et al. |
| 10,637,989 | B1 | 4/2020 | Josh et al. |
| 11,276,407 | B2 | 3/2022 | Reshef et al. |
| 11,461,562 | B2 * | 10/2022 | Papancea ............ H04M 3/5133 |
| 2003/0234763 | A1 * | 12/2003 | Hejza Litwiller ...... G06F 3/167 |
| | | | 345/156 |
| 2005/0010418 | A1 | 1/2005 | McNair et al. |
| 2013/0007147 | A1 | 1/2013 | Toga et al. |
| 2013/0108994 | A1 | 5/2013 | Srinivasa et al. |
| 2016/0171772 | A1 | 6/2016 | Ryznar et al. |
| 2016/0219147 | A1 | 7/2016 | Maxwell et al. |
| 2016/0301810 | A1 | 10/2016 | Dimitroff et al. |
| 2017/0324868 | A1 | 11/2017 | Tamblyn et al. |
| 2017/0359463 | A1 | 12/2017 | Segalis et al. |
| 2019/0139432 | A1 | 5/2019 | Jain et al. |
| 2019/0377544 | A1 | 12/2019 | Darachi, Jr. et al. |
| 2020/0177730 | A1 | 6/2020 | Dutta et al. |
| 2021/0084150 | A1 * | 3/2021 | Nagy ................ H04M 1/72469 |
| 2022/0164550 | A1 | 5/2022 | Papancea et al. |

OTHER PUBLICATIONS

ChoiceView, ChoiceView Visual IVR Insurance Claim [Online], Screenshots, Retrieved from the Internet: https://www.youtube.com/watch?v=FCFGZLp7qOE, Sep. 2020, 2 pages.

International Search Report and Written Opinion for International Application No. PCT/US2021/059911, dated Mar. 1, 2022, 15 pages.

Office Action for U.S. Appl. No. 17/532,662, dated Apr. 4, 2022, 16 pages.

Plum IVR Support, "How to Extend the Time the Caller Has to Enter Numbers," [Online], Feb. 2010, Retrieved from the Internet: https://support.plumvoice.com/viewtopic.php?f=2&t=591, 4 pages.

Uniphore, "Multimodal User Experience Design Best Practices," [Online], Aug. 2021, Retrieved from the Internet: https://www.uniphore.com/blog/multimodal-user-experience-design-best-practices/, 8 pages.

Uniphore, "What's a Multimodal Customer Experience?" [Online], Oct. 2019, Retrieved from the Internet: https://www.uniphore.com/blog/what-s-a-multimodal-customer-experience/, 1 page.

\* cited by examiner

METHOD FOR MULTI-CHANNEL AUDIO SYNCHRONIZATION FOR TASK AUTOMATION

CROSS-REFERENCE TO RELATED APPLICATION

This application is a continuation of U.S. patent application Ser. No. 17/532,662, filed Nov. 22, 2021, and titled "METHOD FOR MULTI-CHANNEL AUDIO SYNCHRONIZATION FOR TASK AUTOMATION", which claims priority to U.S. Provisional Application No. 63/116,952, filed Nov. 23, 2020, and titled "METHOD FOR MULTI-CHANNEL AUDIO SYNCHRONIZATION FOR TASK AUTOMATION", the contents of each of which are incorporated herein by reference in its entirety.

FIELD

In one or more embodiments, audio channels can be synchronized with non-audio channels for task automation, where the audio channels can automatically output audio to direct a user to complete a task on the non-audio channel in response to prompts from the user at the non-audio channel.

BACKGROUND

Contact centers aim to solve a large array of problems. In general, many of the calls received at a contact center can be resolved using existing digital assets such as websites or mobile applications ("apps"). A common example of this is resetting a password or changing a billing address.

SUMMARY

Techniques are provided herein to provide audio synchronization for task automation. In some embodiments, a method includes receiving an indication of a start of a session associated with a user and having an audio channel that is synchronized with a non-audio channel. Determinations are repeatedly made, after the receiving, as to whether a prompt on the non-audio channel has been received from the user. In response to each determination that the prompt on the non-audio channel has not been received from the user, a signal is sent to cause an inaudible output on the audio channel to the user. In response to a determination that the prompt on the non-audio channel has been received from the user, an audible output is selected based on an activity by the user on the non-audio channel, and a signal is sent to cause the audible output to be output on the audio channel.

In some embodiments, a method includes initiating a request for a session associated with a user to cause an audio channel associated with the session to synchronize with a non-audio channel associated with the session. Determinations are repeatedly made whether a prompt on the non-audio channel has been received from the user. An inaudible output is caused on the audio channel to the user in response to each determination that the prompt on the non-audio channel has not been received from the user. An audible output is caused to be output on the audio channel in response to a determination that the prompt on the non-audio channel has been received from the user.

In some embodiments, a method includes receiving a representation of a request from a compute device associated with a user to complete a task including a first step and a second step. An audio channel associated with the user is caused to synchronize with at least one non-audio channel associated with the user. A first signal is sent to cause a first audible output associated with the first step to be output by the audio channel. Determinations are repeatedly made whether a prompt on the at least one non-audio channel has been received from the user. A second signal is sent to cause an inaudible output on the audio channel to the user in response to each determination that the prompt on the at least one non-audio channel has not been received from the user. In response to a determination that the prompt on the at least one non-audio channel has been received from the user, it is determined whether the prompt is in accordance with the first step. A second audible output associated with the second step is selected based on the determining that the prompt is in accordance with the first step. A third audible output is selected based on the determining that the prompt is not in accordance with the first step. A third signal is sent to cause one of the second audible output or the third audible output to be output on the audio channel.

DETAILED DESCRIPTION

Figure 1:
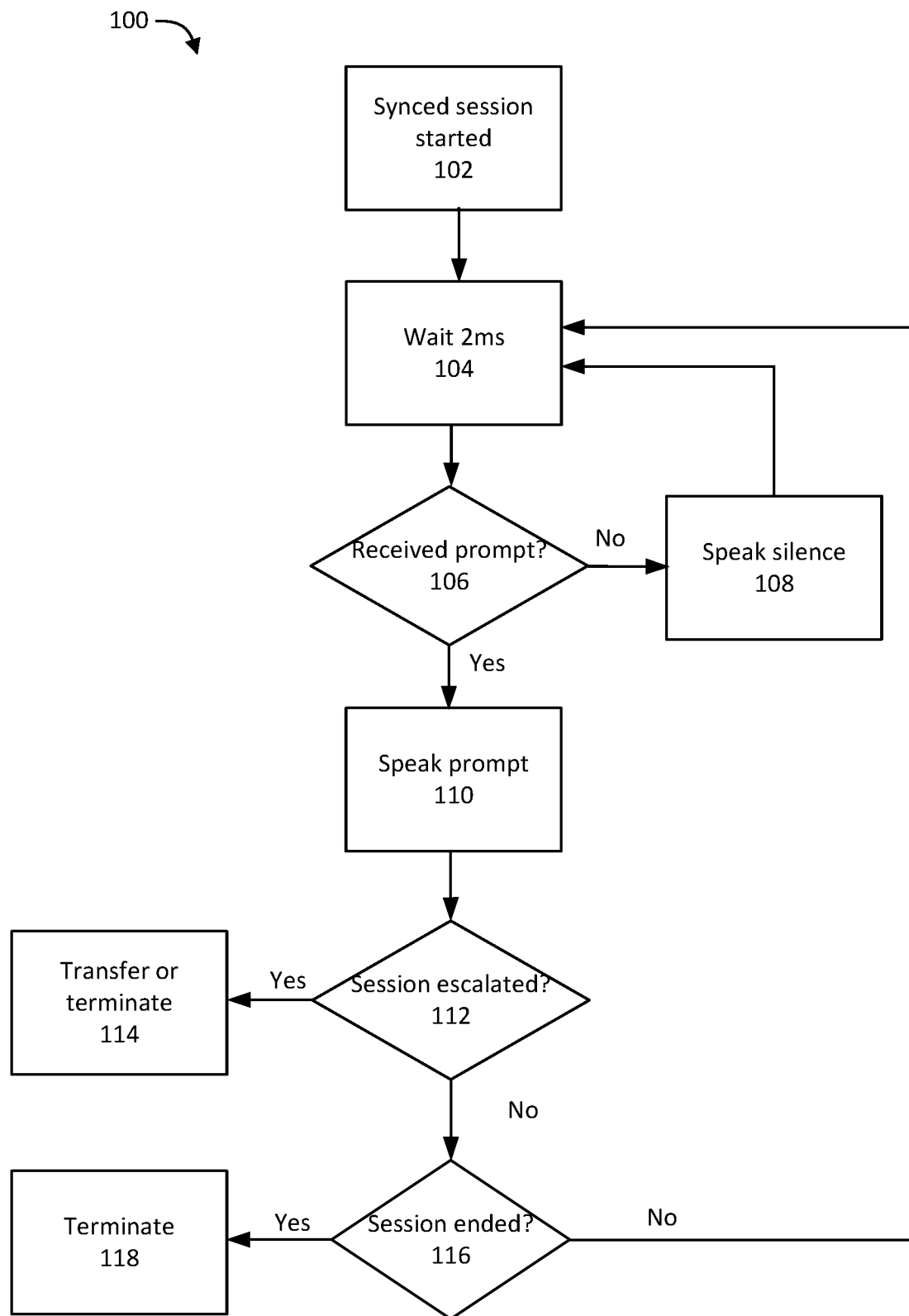
FIG. 1 is a flow diagram showing an audio synchronization method with loop functionality, according to some embodiments.

One or more embodiments are designed to automate routine tasks to ease the strain on contact centers struggling with servicing their customers, while providing prompt customer service.

Known contact center automation systems are typically able to accommodate 30-40% or less of the overall contact/call volume, leaving a large volume of routine tasks for human agent handling. Staff training and onboarding is often cost-intensive and unscalable. Known systems aim to solve these problems by using interactive voice response (IVR) technologies, which take callers through a series of steps involving entering numbers on a dial pad or speaking out information. Known IVR systems are often impractical, however, for tasks that involve user inputs of increased complexity (e.g., passwords, addresses, seat selections, etc.), which can be easily misunderstood by the known state-of-the-art IVR systems. Furthermore, known IVR systems often result in user frustration because of poor language understanding (e.g., producing the message "Sorry, I didn't get that.") or system timeout issues (e.g., producing the message "I did not get your input. Please try again"). For use cases that are too complex, callers are generally transferred to a live agent (where it is not unusual to be stuck in a queue for a while), and are sometimes directed to a website or mobile app without further guidance (e.g., the call drops off or is terminated), which results in a negative user experience and wasted opportunities for automation.

Known automated solutions also often fail to assist callers throughout the full path to resolution of a given task. Calls are either terminated or escalated to live agents, which leads to a significant cost and business impact. In many cases, callers either lack sufficient product education to self-service, or they expect a problem to be directly solved by the contact center agents.

One or more embodiments of the present disclosure leverage digital assets (e.g., websites or apps to execute communication devices such as smartphones and computers) to guide callers towards resolution of their problems using an audio channel synchronized to one or more non-audio channels of digital assets. Contact center automation systems can be better automated to walk users through a given task/step by synchronizing audio channels to non-audio channels. For example, in the context of a phone call, a user (also referred to herein as a caller) receives a text message with a link that leads to a website or mobile application when the user selects that link. Once the link is selected and the related website/mobile application is accessed, the user will receive voice-/audio-based guidance on how to complete a specific task and will continue to follow the guidance, which changes based on the actions the user takes on the user interface (UI) of the respective digital asset. The phone call is active throughout the entire process on the digital asset until the task is resolved or the caller hangs up. As the user progresses through the steps at its own pace, the user gets voice audio feedback from the audio (phone) channel, which can be provided in one or more multiple voices (female or male) and/or one or more languages such as English or Spanish. Rather than terminating the call or escalating to an agent, the connection with the user is maintained while the user voice-guided all the way to task resolution.

In addition, one or more embodiments can be implemented into any audio-capable device, including Smart Home devices such as Amazon Echo® or Google Home®. A user looking to reset their password could speak to their Smart Home device and request assistance. The Smart Home device artificial intelligence (AI) assistant, used in combination with one or more embodiments, would then send a message to the user's phone (SMS, push notification, email, etc.) with a link to a non-audio digital channel (e.g., a website or a mobile app running on the user's phone) where the user can change its password. Instead of terminating the Smart Home session upon responding to the user's request, the session is maintained by such embodiments and will remain active until the task is resolved through the multi-channel experience or upon an explicit termination request from the user (e.g., "Alexa stop"). Throughout the active Smart Home session, similar to interactions over a phone call, the Smart Home device will provide audio feedback whenever the user takes an action within the non-audio digital channel.

Thus, one or more embodiments can automate tasks for contact centers and training courses that currently require or involve human interaction, thus reducing costs and increasing operational efficiency.

One or more embodiments leverage digital assets (e.g., smartphone) to guide users towards resolution of their problems using an audio channel synchronized to the respective digital asset (and to its non-audio channel(s)). The audio channel can be over the phone using a smart IVR, a smart home speaker (Amazon Echo®, Google Home®, etc.), smart headsets or earphones (Amazon Echo® Buds, Samsung Galaxy Buds®, etc.) or smart car integrated software (Apple CarPlay®, Amazon Echo Auto®, etc.). Digital assets can be websites accessed over smartphones, laptops or desktops, desktop applications (macOS®, Windows®, etc.), mobile applications over smartphones or tablets (iOS®, Android®) and IoT devices (smart fridges, smart vacuums, etc.).

One or more embodiments includes the ability to synchronize (i.e., link) at least one audio channel with at least one non-audio channel to start/maintain a session. Synchronizing can refer to, for example, starting/maintaining a session where input/output of one channel is coordinated and/or sequenced based on the input/output of a different channel. A session can refer to a temporary and interactive information interchange between at least one audio channel and at least one non-audio channel. The session is established at a certain point in time, and ended at a later point in time. The session can include one or more messages sent in one direction and/or both directions. The session can be stateful and/or stateless. In some implementations, a session can refer to an event where at least one audio channel is synchronized with at least one non-audio channel, where the audio and non-audio channel(s) are associated with the same device, different devices, or a combination of both. When synchronized, prompts (i.e., actions) performed at the at least one non-audio channel can cause the at least one audio channel to output audio that can cause a user to perform one or more steps that help to accomplish a given task. A prompt can refer to any action performed at the at least one non-audio channel. Examples of prompts can include clicking/selecting an icon, typing text, scrolling, zooming in/out, etc.

One or more embodiments includes the ability to synchronize an audio channel with one or more non-audio channels in the same session. In some implementations, an audio channel can output an audible output based on activities by a user on a single non-audio channel (e.g., smartphone). In some implementations, an audio channel can output an audible output based on activities by a user on a plurality of non-audio channels (e.g., smartphone and laptop).

One or more embodiments includes the ability to operate over any device that has the capability of outputting audio based on signals received over a network (internet or local). For instance, a user may initially receive audible output from a first compute device capable of outputting audio (e.g., their smartphone). Thereafter, the user can receive audible output from a second compute device capable of outputting audio (e.g., their earphones) instead of (or in addition to) the first compute device.

One or more embodiments includes the ability to speak out audio in multiple languages, voices, and/or dialects. In some implementations, the language(s)/voice(s)/dialect(s) used to speak out audio can be selected by a user via a non-audio channel.

One or more embodiments includes the ability to choose the voice before, after and/or during the synchronized multi-channel interaction. For example, audio can be output using a voice that is male, female, old, young, etc. during the synchronized multiple-channel interaction.

One or more embodiments includes the ability to escalate to a different channel of communication such as live chat or a live agent. In some implementations, in response to the indication that that user would like to escalate to a different channel, a signal can be sent from a communication device associated with the user to connect with a communication device associated with a live agent or live chat. The indication can be, for example, selecting a button/typing text indicating that the user would like to escalate to a different channel, reaching a step in a task that requires a live agent or live chat, not receiving a prompt for a period time greater than a predetermined threshold, etc.

One or more embodiments includes the ability to capture/log events at every step of the process (i.e., from initiating a session to ending the session). In some implementations, attributes related to interactions at the non-audio channel (e.g., how long it took a user to respond) can be used to provide insights for improving audio output by an associated audio channel (e.g., update how an audio output is phrased). In some implementations, a metric can be tracked associated with how often a session reached a predefined phase (e.g., completing a given task, changing to a different channel).

One or more embodiments can perform a method that includes the three steps described below.

Step 1: A user can request assistance for a task using one of the following: (i) call a phone number via communication device (e.g., a smartphone) and engage with a smart IVR that identifies the task to be resolved, (ii) engage with a voice-powered automated assistant such as a digital voice-powered automated assistant (e.g., website, mobile app) or a physical voice-powered automated assistant (e.g., a smart speaker) that identifies the task to be resolved, or (iii) click a button or fill out online a form that schedules an outbound call to the user's mobile phone.

Step 2: The user is presented with a method to start the audio synchronization: (i) a short message service (SMS) text is sent to the user's phone number, the SMS text containing a unique link that when selected causes the user's phone to connect to a digital asset, and (ii) a code is sent to the user's phone (e.g., via SMS, mobile app, etc.) or spoken to the user (e.g., via a Smart Speaker), such that the user has to enter the code into an input field on a digital asset of choice (i.e., website, mobile app, TV app, etc.).

Alternatively, no action is needed to start the synchronization in instances such as a callback, where the synchronized audio session can begin without additional prompts from the user. This can happen, for example, when the user expresses advance interest in a voice-guided/synchronized experience (e.g., by scheduling a callback).

Step 3: The audio synchronization is confirmed by an application programming interface (API) call to an embodiment, which synchronizes the audio channel with the non-audio channel(s) into a session. Once the synchronized session is established, the audio channel will output relevant audio-based information based on actions taken through the non-audio channel. Such actions taken through the non-audio channel can include, for example, the press of a button, selection of a list item or filling out an input field (e.g., via the user's phone).

Any noise transmitted over the audio channel from the user or the environment can be ignored. The audio synchronization is done using an infinite loop that continuously (or repeatedly over short time periods) checks whether an action by the user was performed on the digital asset or not. If an action was performed by the user, the audio channel will output the relevant audio-based information pertaining to the action taken. If no action was taken, the audio channel will output audio silence (e.g., an audio output at a frequency that is inaudible to people) at intervals as little as 2 milliseconds. The repeatedly and/or continuously checking of whether an action was performed or not can be performed because the user may need time to complete an action on the non-audio channel before being told another audible output (e.g., being told the next step in a process, being told a reminder of a current action that needs to be performed). Said similarity, upon a user being audibly told a step (i.e., a compute device outputting audio to the user), the user may need time to comprehend the step and complete the step, in which case a period of inaudible audio can be desirable. For example, a user may need to get paperwork to complete a form, pull out their credit card to enter payment information, contact another user to verify information, etc. Furthermore, in some implementations, the audio synchronization can be interrupted either by escalation (e.g., a request by the user to leave the synchronized session and instead engage with a live chat or agent) or by the user terminating the session (e.g., hanging up the call on the user device, kill switch on the user device, etc.).

One or more embodiments can be supported by an Instrumentation software development kit (SDK)/API that can be used to send signals whenever the user takes action within the non-audio digital channel. The Instrumentation SDK can include, for example, a software wrapper for a HTTP REST API and be integrated with any computer system that supports the HTTP REST protocol.

In some embodiments, a method for synchronizing an audio channel to one or more non-audio channels includes using an infinite loop that outputs silence during user inactivity and that outputs relevant audio feedback/guidance upon user activity.

One or more embodiments can provide the ability to switch or change audio feedback (e.g., among different voices and/or languages) before of the method is performed or while the method is performed.

One or more embodiments can be implemented or performed using a mobile device (such as a smart phone), a smart speaker, earphones, an Internet of Things (IoT) device, or any other device capable of receiving, processing, and outputting audio.

In some embodiments, an instrumentation SDK/API enables a non-audio channel to send signals to the system to trigger action (e.g., synchronization) within the audio channel.

Systems and methods described herein can be implemented using any of a wide variety of digital channels (e.g., websites, mobile apps, desktop apps, etc.) and can include functionality for switching between/among those channels during use. Alternatively or in addition, according to one or more embodiments set forth herein, information can be conveyed to end users in a multimodal fashion, e.g., including two or more of: visual ("viewing" mode), auditory ("listening" mode), reading/writing, and kinesthetic ("doing" mode).

In one or more embodiments, the method can automatically terminate in response to determining that a session has been escalated to a different channel or type of communication, such as live agent or live chat communication.

FIG. 1 is a flow diagram showing an audio synchronization method 100, with loop functionality, according to some embodiments. As shown in FIG. 1, the method 100 begins at 102, when a synchronized ("synced") session is started. At 104, a pause, dwell, or wait period of 2 milliseconds (ms) occurs. At 106, a determination is made as to whether a prompt (e.g., from the non-audio channel) has been received or detected. If, at 106, it is determined that no prompt has been received or detected, silence is output (or "spoken"; such spoken silence can be, for example, an audio sound that is inaudible to humans) at 108, and the method 100 loops back to the pause step at 104. If, at 106, it is determined that a prompt has been received or detected, a prompt is output (or "spoken") at 110. At 112, a determination (e.g., based on the prompt received or detected at 106) is made as to whether the session has been escalated. If, at 112, it is determined that the session has been escalated, the session is transferred or terminated, at 114. If, at 112, it is determined that the session has not been escalated, a further determination is made at 116 as to whether the session has ended. If, at 116, it is determined that the session has ended, the method 100 terminates at 118. If, at 116, it is determined that the session has not ended, the method 100 loops back to the pause step at 104.

Figure 2:
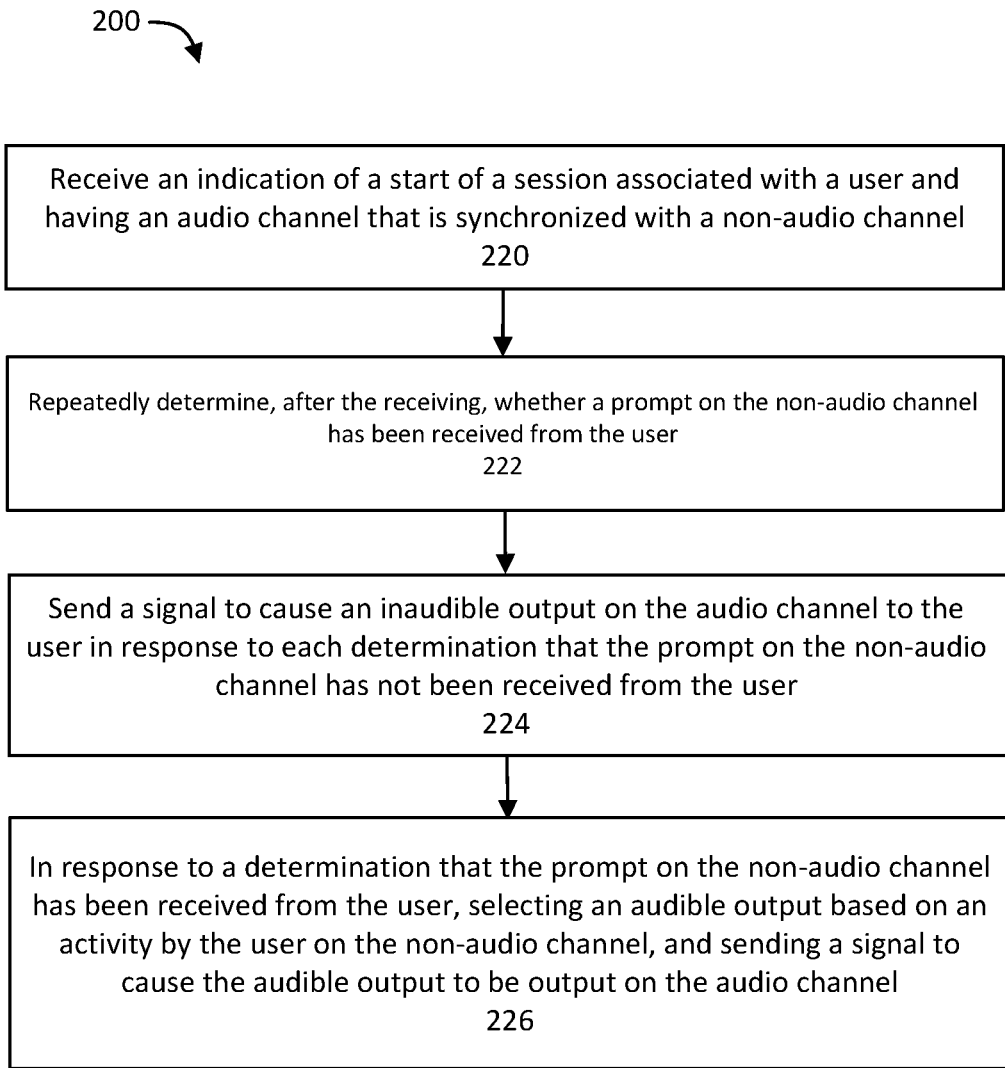
FIG. 2 is a flow diagram showing a method for coordinating actions between an audio channel and a synchronized non-audio channel, according to some embodiments.

FIG. 2 is a flow diagram showing a method 200 for coordinating actions between an audio channel and a synchronized non-audio channel, according to some embodiments. As shown in FIG. 2, the method 200 includes receiving, at 220, an indication of a start of a session associated with a user and having an audio channel that is synchronized with a non-audio channel. The non-audio channel can be associated with a communication device of the user, the communication device of the user having a plurality of output modes. At 222, determinations are repeatedly made regarding whether a prompt on the non-audio channel has been received from the user. At 224, and in response to each determination that the prompt on the non-audio channel has not been received from the user, a signal is sent to cause an inaudible output on the audio channel to the user. At 226, in response to a determination that the prompt on the non-audio channel has been received from the user: an audible output is selected based on an activity by the user on the non-audio channel, and a signal is sent to cause the audible output to be output on the audio channel. In some implementations, 224 and/or 226 can be performed automatically without requiring additional human intervention.

In some embodiments, a method for coordinating actions between an audio channel and a synchronized non-audio channel (e.g., similar to method 200 of FIG. 2) can also include selecting, at a first time, a first language from a plurality of languages, and selecting, at a second time after the first time, a second language from the plurality of languages, where the selecting the audible output is based on the second language.

In some embodiments, the audio channel is associated with a first device type from a plurality of device types, and the non-audio channel is associated with a second device type from the plurality of device types. The plurality of device types can include a phone, a smart speaker, an earphone and an Internet of Things (IoT) device.

In some embodiments, the non-audio channel is associated with a first digital non-audio channel and the selecting is performed with respect to the first digital non-audio channel during a first time period. During a second time period after the first time period, the non-audio channel is associated with a second digital non-audio channel different from the first digital non-audio channel, and the selecting is performed with respect to the second digital non-audio channel.

In some embodiments, the repeatedly determining, the sending the signal to cause the inaudible output, the selecting the audible output and the sending the signal to cause the audible output being repeated until an end of the session, and the method also includes, after the start of the session and before the end of the session, performing at least one of: determining that the prompt on the audio channel received from the user includes an indication that the user would like to discontinue the non-audio channel, or determining that a prompt on the non-audio channel includes an indication that the user would like to discontinue the non-audio channel. The method can also include terminating the non-audio channel of the session, in response to the indication that that user would like to discontinue the non-audio channel, and sending, after the terminating, a signal to connect a communication device of the user with a communication device of a live agent.

In some embodiments, a method for coordinating actions between an audio channel and a synchronized non-audio channel (e.g., similar to method 200 of FIG. 2) can also include receiving, via an application programming interface (API), a signal from a device for the non-audio channel, and the selecting the audible output being based on the signal from the device for the non-audio channel.

One or more embodiments of the present disclosure can be used in call centers to assist with completion of routine tasks. In some implementations, one or more embodiments of the present disclosure can be used within a school/education context, such as for COVID-19 health response (e.g., updating vaccination status, contact tracing), reporting an absence, semester registration, paying tuition, etc. In some implementations, one or more embodiments of the present disclosure can be used within a travel/hospitality context, such as for changing an air travel seat, roadside assistance, forgotten login credentials for an account, re-opening bookings, etc. In some implementations, one or more embodiments of the present disclosure can be used within a banking context, such as for credit card replacement, transactions dispute, forgotten login credentials for an account, etc. In some implementations, one or more embodiments of the present disclosure can be used within an insurance context, such as for claim submission, forgotten login credentials for an account, etc. In some implementations, one or more embodiments of the present disclosure can be used within a technical support context, such as for forgotten login credentials for an account, identity verification, internet service provider router/internet troubleshooting, etc.

One or more embodiments can be used, for example, in onboarding/training courses to assist humans with familiarization of different tools, software or hardware.

One or more embodiments can reduce operating costs of call centers, as the cost per minute of using one or more embodiments discussed herein can be lower than the average cost for a live agent. One or more embodiments can increase operational efficiency by automating tasks that would otherwise be human assisted or serviced. One or more embodiments can educate an end user about a new or existing digital channel that they could use to self-service in the future. One or more embodiments can maintain and/or improve end user satisfaction by enabling fast and accurate self-service, offered 24×7, with expedited resolutions because the end user controls the outcome of their experience. One or more embodiments can provide a wide range of analytics and insights that can help improve the use of the techniques discussed herein as well as the overall experience. The techniques discussed herein can be device agnostic, and can be integrated into any device with audio output and/or network connectivity capabilities.

Figure 3:
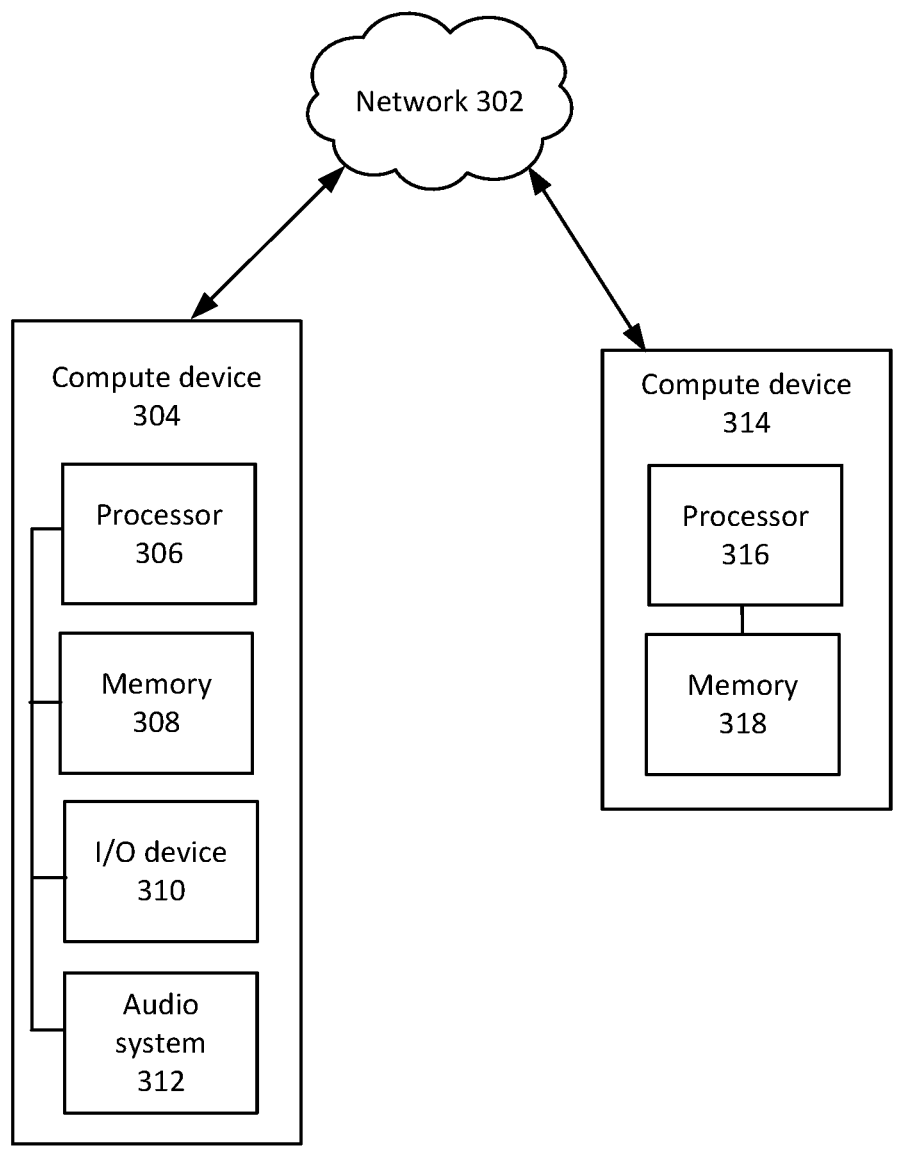
FIG. 3 is a block diagram showing a system for setting up and coordinating actions between an audio channel and a non-audio channel, according to some embodiments.

FIG. 3 shows a block diagram of a system that can be used to provide a user with a session, according to an embodiment. Compute devices 304, 314 can communicate with one another via the network 302. The compute device 304 can be associated with a user attempting to complete a task (e.g., login to an account, change a seat, make a reservation, order a prescription, get a refund), and can include a processor 306, memory 308, input/output (I/O) device 310, and audio system 312, each operatively coupled to one another. The I/O device 310 can be used to display output (e.g., via a display) and/or receive input (e.g., via a keyboard, via a mouse, e.g., via touch). The audio system 312 can be used to receive audio input (e.g., via a microphone) and/or transmit audio output (e.g., via a speaker). The user can use the compute device 304 to request assistance for a task. The compute device 314 can be used to assist the user/compute device 304 with a given task (e.g., automatically without requiring a live agent/chat). Said similarly, the compute device 314 can cause audio output to be output by the compute device 304 automatically (i.e., without human intervention) in response to the user performing a prompt via the I/O device 310. In some implementations, the compute device 314 is associated with a call center. The compute device 314 includes a processor 316 and memory 318 operatively coupled to the processor 316.

In some implementations, the user can request assistance for a task by calling compute device 314 with compute device 304, where the compute device 314 can use a smart IVR (not shown in FIG. 3) to identify the task to be resolved based on the user's voice commands. For example, the user can use the I/O device 310 to enter a phone number associated with the compute device 314, and once connected, use the audio system 312 to describe the task. The processor 316 of the compute device 314 can then use the smart IVR, which can be stored in the memory 318, to determine the task from the user's description.

In some implementations, the user can request assistance for a task by speaking to the audio system 312 (without having to make a phone call prior). In some implementations, the user's captured audio can automatically be shared with the compute device 314, which can use smart IVR to identify the task and begin a session. In some implementations, a smart IVR can be stored in the memory 308 of the compute device 304, where the compute device 304 can determine the task, and transmit a signal representing the task to the compute device 314 (rather than the compute device 314 determine the task).

In some implementations, the user can request assistance for a task by making a selection(s) using the I/O device 310 (e.g., selecting the task from a list of tasks, typing the task into a text box, filling out a form). The selection(s) can be shared with the compute device 314.

In some implementations, the user can request assistance by speaking to the audio system 312 and making a selection(s) using the I/O device 310. For example, a user can describe audibly an issue to be solved by the audio system 312, and a list of associated tasks that can solve the issue can be displayed on the I/O device 310. The user can select a task(s) from the list using the audio system 312 and/or I/O device 310, and the compute device 314 can be made known about the selected task(s).

In some implementations, the user can schedule an outbound call from the compute device 314 to compute device 304. The outbound call can be scheduled by the user using the I/O device 310 and/or audio system 312.

After assistance has been requested and the task has been identified, the compute device 314 can cause audio synchronization to be initiated at the compute device 304. Audio synchronization can refer to at least one audio channel associated with the compute device 304 being synchronized with at least one non-audio channel associated with the compute device 314. In some implementations, the compute device 314 can cause a link (e.g., hyperlink) to be sent to the compute device 304 (e.g., via text message, via email) that causes the compute device 304 to display, once the link has been selected and via the I/O device 310, a digital asset (e.g., website, mobile application, TV application). The user can select the link using the I/O device 310 to access the digital asset.

In some implementations, the compute device 314 can cause a code (e.g., a numerical code or an alphanumeric code) to be sent to the compute device 304 and/or spoken by the audio system 312 of the compute device 304. The user can enter the code into an input field on the I/O device 310 to access the digital asset in a format of their choosing (e.g., via a website, via a mobile application, via a TV application).

In some implementations, no action is needed to start the audio synchronization (e.g., when the user has expressed advanced interest in a voice-guided/synchronized experience). For example, in cases such as a callback, the audio synchronization can begin automatically at the compute device 304 without additional prompts from the user.

The compute device 304 can confirm the audio synchronization via an API to the compute device 314, which can synchronize the audio channel with one or more non-audio channels into a session. As the user interacts with a digital asset via the I/O device 310, the compute device 314 can be made aware of the interactions (or lack thereof), and cause an appropriate audio output via the audio system 312. The memory 308 can include an instrumentation SDK, and the instrumentation SDK can include one or more APIs (e.g., HTTP REST API). The instrumentation SDK/one or more APIs can be used by the compute device 304 to send signals to the compute device 314 whenever the user has taken an action at the I/O device 310, where the compute device 314 can use those signals to determine an appropriate audio output. If a signal is not received, however, the audio system 312 does not output an audible sound. In some implementations, audio input into audio system 312 is ignored during the session (i.e., after the session has started and until the session has ended). The session can be ended by escalation (e.g., to a live chat, to an agent) or the user terminating the session (e.g., hanging up the call, selecting a button on the I/O device 310, turning off the compute device 304).

The processors 306, 316 can be, for example, a hardware-based integrated circuit (IC) or any other suitable processing device configured to run and/or execute a set of instructions or code. For example, the processors 306, 316 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processors 306, 316 can be operatively coupled to their associated memories 308, 318 through a system bus (e.g., address bus, data bus and/or control bus). The processors 306, 316 can be configured to include and/or execute several components, units and/or instructions that may be configured to perform any of the techniques discussed herein. The components can be hardware-based components (e.g., an integrated circuit (IC) or any other suitable processing device configured to run and/or execute a set of instructions or code) or software-based components (executed by the processors 306, 316), or a combination of the two.

The memories 308, 318 can be, for example, a random-access memory (RAM), a memory buffer, a hard drive, a read-only memory (ROM), an erasable programmable read-only memory (EPROM), and/or the like. In some instances, the memories 308, 318 can store, for example, one or more software programs and/or code that can include instructions to cause their associated processors 306, 316 to perform one or more processes, functions, and/or the like including those described herein. In some implementations, the memories 308, 318 can include extendable storage units that can be added and used incrementally. In some implementations, the memories 308, 318 can be a portable memory (for example, a flash drive, a portable hard disk, and/or the like) that can be operatively coupled to the processors 306, 316. In some implementations, the memories 308, 318 can be remotely operatively coupled with their associated compute devices 304, 314.

The I/O device 310 can be operatively coupled to the processor 306, memory 308, and audio system 312. The I/O device 310 can be any type of system that can display output and/or receive input. In some implementations, the I/O device 310 can include a display, such as a CRT (Cathode Ray Tube), LCD (Liquid Crystal Display), LED (Liquid Emitting Diode), or OLED (Organic Light Emitting Diode) display. In some implementations, the I/O device 310 can include a touch screen that can receive inputs via touch. In some implementations, the I/O device 310 can include peripherals (e.g., mouse, keyboard) operatively coupled to a display that can receive input and allow a user to interact with the display. In some implementations, the I/O device 310 can include a display that can receive wireless signals as input (e.g., from a remote control).

The audio system 312 can be operatively coupled to the processor 306, memory 308, and I/O device 310, and can include components to receive audio and/or output audio. The audio system 312 can include one or more microphones and/or one or more speakers.

The network 302 can be any suitable communications network for transferring data, operating over public and/or private networks. For example, the network 302 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 302 can be a wireless network such as, for example, a Wi-Fi or wireless local area network ("WLAN"), a wireless wide area network ("WWAN"), and/or a cellular network. In other instances, the network 302 can be a wired network such as, for example, an Ethernet network, a digital subscription line ("DSL") network, a broadband network, and/or a fiber-optic network. In some instances, the network 302 can use APIs and/or data interchange formats, (e.g., Representational State Transfer (REST), JavaScript® Object Notation (JSON), Extensible Markup Language (XML), Simple Object Access Protocol (SOAP), and/or Java® Message Service (JMS)). The communications sent via the network 214 can be encrypted or unencrypted. In some instances, the network 302 can include multiple networks or subnetworks operatively coupled to one another by, for example, network bridges, routers, switches, gateways and/or the like (not shown).

Although not shown in FIG. 3, the functionalities of the compute device 304 can be performed by a plurality of different compute devices. For example, a first compute device can include a processor, memory, and I/O device (e.g., I/O device 310), and a second compute device can include a different processor, a different memory, and an audio system (e.g., audio system 312). The first compute device can be used by the user for non-audio-related activities (e.g., completing a task within a digital asset, sending signals indicating interactions with a digital asset), and the second compute device can be used by the user for audio-related activities (e.g., requesting a task via a voice command, output audio). It can also be appreciated that these functionalities can be further split using additional compute devices.

Although not shown in FIG. 3, multiple compute devices with I/O devices can be used to enable multiple non-audio channels to be used, according to an embodiment. For instance, a first compute device with a I/O device can be used to receive prompts from a user via a first non-audio channel, and a second compute device different than the first compute device with its own I/O device can be used to receive prompts from a user via a second non-audio channel different than the first non-audio channel. A single audio channel (which can be associated with the first compute device, second compute device, or a different compute device) can be used to output audio in response to prompts from the user at both the first and second compute devices. It can be appreciated that any number of non-audio channels can be used across any number of compute devices.

Although not shown in FIG. 3, multiple compute devices with audio output capability can be used to enable multiple audio channels to be used, according to an embodiment. For example, a first compute device with a speaker can be used to output a first audio output via a first audio channel, and a second compute device with its own speaker can be used to output a second audio output via a second audio channel different than the first audio channel. One or more non-audio channels (which can be associated with the first compute device, second compute device, or a different compute device) can be used to receive prompts from a user, where the first compute device, second compute device, or a combination of both can be used to output audio in response to the prompts.

Figure 4:
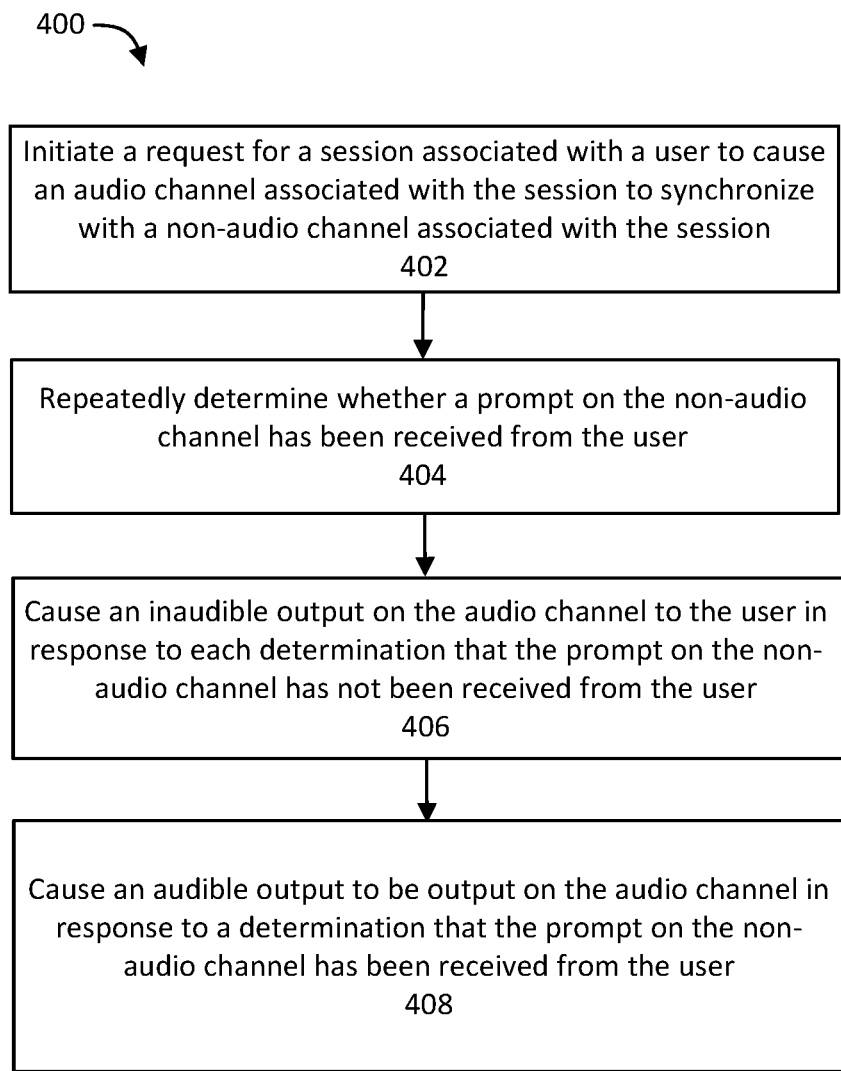
FIG. 4 is a flow diagram showing a method for coordinating actions between an audio channel and a synchronized non-audio channel, according to some embodiments.

FIG. 4 is a flow diagram showing a method 400 for coordinating actions between an audio channel and a synchronized non-audio channel, according to some embodiments. As shown in FIG. 4, the method 400 includes initiating, at 402, a request for a session associated with a user to cause an audio channel associated with the session to synchronize with a non-audio channel associated with the session. In some implementations, the initiating can be performed by a phone, computer, tablet, smart watch, smart speaker or any other Internet of Things (IoT) device via a link, voice command, phone call, submitting a form, pressing a button, etc. At 404, determinations are repeatedly made whether a prompt on the non-audio channel has been received from the user. In some implementations, an instrumentation SDK/API can be used to send a signal whenever a prompt has been received from the user. Thus, the lack of a signal can indicate that a prompt has not been received from the user. At 406, an inaudible output is caused to output on the audio channel to the user in response to each determination that the prompt on the non-audio channel has not been received from the user. At 408, an audible output is caused to be output in response to a determination that the prompt on the non-audio channel has been received from the user. In some implementations, this can look like receiving a signal representing the audible output, and outputting the audible output via a speaker.

In some embodiments, the audio channel is configured to ignore audible input from the user during the session. In other words, a user can only receive additional audio output by interacting with the non-audio channel, and any interactions with the audio-channel will not cause an audio output to output.

In some embodiments, the audible output includes a first portion associated with a first voice and a second portion associated with a second voice different than the first voice. Said similarly, the audible output can be recited using a plurality of voices (e.g., voice of a man and voice of a female, voice of a first person speaking a first language and a second person speaking the first language, etc.).

In some embodiments, the method 400 further comprises receiving an indication to end the session, and connecting to a compute device associated with at least one of a live chat or live agent. The indication can be received from a user (e.g., by pressing a button), or received automatically in response to not receiving any prompts at the non-audio channel for a predetermined period of time (e.g., 30 seconds, 60 seconds).

In some embodiments, the audio channel is associated with a first compute device, and the at least one non-audio channel is associated with a second compute device different than the first compute device. In some implementations, the first compute device can include a speaker associated with the audio channel, and the second compute can include an I/O device and/or microphone associated with the at least one non-audio channel.

In some embodiments, 402, 404, 406, and/or 408 are performed by a first compute device. For example, at 402, the first compute device can make a phone call. The first compute device can perform 406 by (1) sending a signal indicating that a prompt has not been received and/or not sending a signal indicating that a prompt has been received, (2) receiving a signal indicating the inaudible output to be output on the audio channel, and (3) outputting the inaudible output. The first compute device can also perform 408 by (1) sending a signal indicating that a prompt has been received, (2) receiving a signal indicating the audible output to be output on the audio channel, and (3) outputting the audible output.

In some embodiments, 402, 404, 406, and/or 408 are performed by a voice assistant device (i.e., smart speaker). Method 400 can further include receiving, by the voice assistant device, a voice command from the user that includes an indication of the request. At 402, a request for a session can performed automatically in response to the receiving of the voice command. At 402, the voice assistant device can send a signal to a first compute device (e.g., compute device 304) and/or second compute device (e.g., compute device 314) to cause the first and/or second compute device to generate the session. At 404, the voice assistant device can receive a signal indicating whether a prompt has been received from the first and/or second compute device. If the signal indicates that no prompt has been received, at 406, the voice assistant generates an inaudible output/does not generate an audible output. If the signal indicates that a prompt has been received, the voice assistant can, at 408, (1) receive a signal representing the audible output to be output from the first and/or second compute device, and (2) output the audible output.

Any of 406, and/or 408 can be performed automatically without requiring additional human input. In some implementations, at 406, an inaudible output can be caused automatically in response to each determination that the prompt on the non-audio channel has not been received from the user. In some implementations, at 408, an audible output can be caused automatically in response to a determination that the prompt on the non-audio channel has been received from the user.

Figure 5:
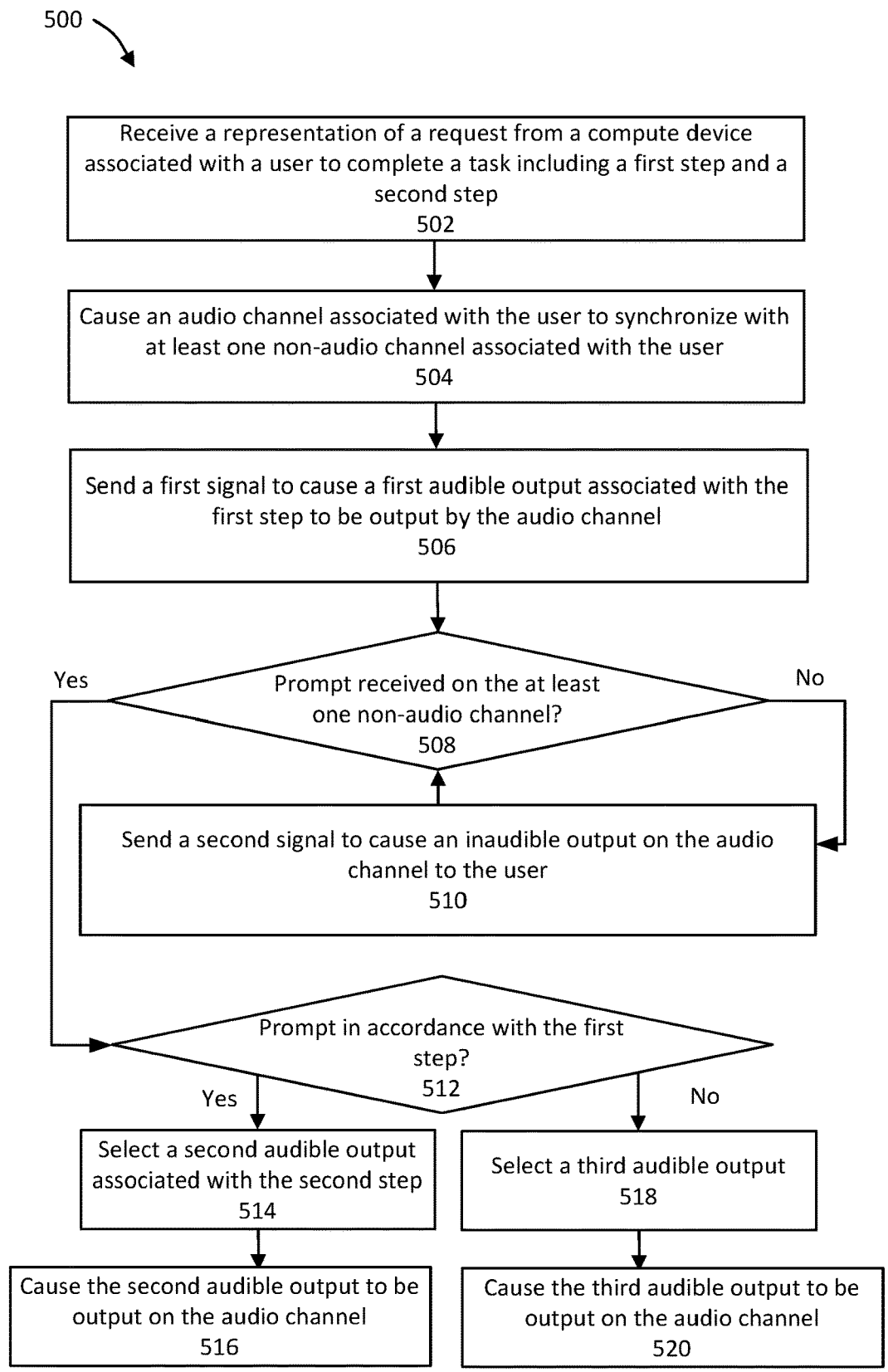
FIG. 5 is a flow diagram showing a method for coordinating actions between an audio channel and a synchronized non-audio channel, according to some embodiments.

FIG. 5 is a flow diagram showing a method 500 for coordinating actions between an audio channel and a synchronized non-audio channel, according to some embodiments. At 502, a representation of a request from a compute device associated with a user to complete a task including a first step and a second step is received. For example, the user with the compute device may type and/or speak into their compute device (e.g., compute device 304) a task that they would like to accomplish, such as changing an airline seat or opening a new bank account. Steps refers to sub-tasks that can be completed to complete a task, such as entering in a name, selecting a seat, entering payment information, picking a bank account type, etc. In some implementations, the representation of the request is received via a phone call, where a user can audibly describe a task, and a smart IVR can be used to determine the task.

At 504, an audio channel associated with the user is caused to synchronize with at least one non-audio channel associated with the user. In some implementations, an instrumentation SDK/API can be used to perform 504.

At 506, a first signal is sent to cause a first audible output associated with the first step (e.g., to the compute device from 502, a different compute device than the compute device from 502) to be output by the audio channel. In some implementations, the first audible output can be a voice speaking the first step to the user. For example, if a task is changing an airline seat, the first audible output can audibly request the user to enter a confirmation code of a purchased ticket into a text box associated with the at least one non-audio channel.

At 508, it is determined whether a prompt on the at least one non-audio channel has been received from the user. The prompt may or may not be in accordance with the first step. The prompt can be, for example, the user entering a valid confirmation code of a purchased ticket into a correct text box. The prompt can also be, for example, the user entering an incorrect confirmation code into the correct text box, the user entering a correct confirmation code into the wrong text box, etc. If 508 is no, proceed to 510. If 508 is yes, proceed to 512. In some implementations, 508 proceeds to 510 after waiting a predetermined amount of time for a prompt, such as 1 ms, 2 ms, 3 ms, etc.

At 510, send a second signal to cause an inaudible output on the audio channel to the user. 510 can be performed automatically without additional human input. After 510, return to 508.

At 512, it is determined whether the prompt is in accordance with the first step. Said similarly, it is determined if the user performed the first step from 506 correctly. If 512 is yes, proceed to 514. If 512 is no, proceed to 518.

At 514, a second audible associated with the second step is selected. The second step can refer to the next sub-task that needs to be performed after the first step to complete a task. For example, if the first step/first audible output was to enter a confirmation code, the second step/second audible output can be to select a new airline seat. At 516, the second audible output is caused to output on the audio channel.

At 518, a third audible output is selected. The third audible output can be the same as or different than the second audible output. In some implementations, the third audible output is a repeat of the first audible output. In some implementations, the third audible output indicates that the first step has not been completed correctly. In some implementations, the third audible output indicates an action that can be performed at the at least one non-audio channel to terminate the session and/or connect with a live user and/or chat. At 520, the third audible output is caused to output on the audio channel.

In some embodiments, the method 500 can continue to receive additional prompts and output additional audible outputs based on the additional prompts to finish a given task and/or until the session is terminated. For instance, if the prompt at 508 is a first prompt, it can be repeatedly determined whether a second prompt on the at least one non-audio channel has been received from the user (the second prompt occurring after the first prompt). A fourth signal to cause the inaudible output on the audio channel to the user can be sent in response to each determination that the prompt on the at least one non-audio channel has not been received from the user. In response to the determination that the second prompt on the at least one non-audio channel has been received from the user, (1) a fourth audible output is selected based on an activity by the user on the at least one non-audio channel, and (2) a fourth signal is sent to cause the fourth audible output to be output on the audio channel. The fourth audible output can be selected based on whether the second prompt was in accordance with the second audible output if 512 was yes, or whether the second prompt was in accordance with the third audible output if 512 was no.

In some implementations, method 500 further comprises transmitting a hyperlink to the compute device, where the compute device is a mobile device. In some embodiments, the hyperlink can be included in a text message and/or email. 504 can be performed automatically in response to the user selecting the hyperlink.

In some implementations, the compute device is a first compute device, and method 500 further comprises connecting to a second compute device associated with at least one of a live chat or a live agent in response to an indication from the user to connect with at least one of the live chat of the live agent. The indication can be, for example, terminating the session.

In some embodiments, a method comprises receiving an indication of a start of a session associated with a user and having an audio channel that is synchronized with a non-audio channel; repeatedly determining, after the receiving, whether a prompt on the non-audio channel has been received from the user; sending a signal to cause an inaudible output on the audio channel to the user in response to each determination that the prompt on the non-audio channel has not been received from the user; and in response to a determination that the prompt on the non-audio channel has been received from the user: selecting an audible output based on an activity by the user on the non-audio channel, and sending a signal to cause the audible output to be output on the audio channel.

In some implementations, the method further comprises: selecting, at a first time, a first language from a plurality of languages; and selecting, at a second time after the first time, a second language from the plurality of languages; the selecting the audible output being based on the second language.

In some implementations, the audio channel is associated with a first device type from a plurality of device types and the non-audio channel is associated with a second device type from the plurality of device types, the plurality of device types includes a phone, a smart speaker, an earphone and an Internet of Things (IoT) device.

In some implementations, the method further comprises receiving, via an application programming interface (API), a signal from a device for the non-audio channel, the selecting the audible output being based on the signal from the device for the non-audio channel.

In some implementations, during a first time period, the non-audio channel is associated with and the selecting is performed with respect to a first digital non-audio channel, and during a second time period after the first time period, the non-audio channel is associated with and the selecting is performed with respect to a second digital non-audio channel different from the first digital non-audio channel.

In some implementations, the repeatedly determining, the sending the signal to cause the inaudible output, the selecting the audible output and the sending the signal to cause the audible output being repeated until an end of the session, the method further comprising: after the start of the session and before the end of the session, performing at least one of: determining that the prompt on the audio channel received from the user includes an indication that the user would like to discontinue the non-audio channel, or determining that a prompt on the non-audio channel includes an indication that the user would like to discontinue the non-audio channel; terminating the non-audio channel of the session, in response to the indication that that user would like to discontinue the non-audio channel; and sending, after the terminating, a signal to connect a communication device of the user with a communication device of a live agent.

In some implementations, the non-audio channel is associated with a communication device of the user, the communication device of the user having a plurality of output modes.

In some embodiments, a method comprises initiating a request for a session associated with a user to cause an audio channel associated with the session to synchronize with a non-audio channel associated with the session; repeatedly determining whether a prompt on the non-audio channel has been received from the user; causing an inaudible output on the audio channel to the user in response to each determination that the prompt on the non-audio channel has not been received from the user; and causing an audible output to be output on the audio channel in response to a determination that the prompt on the non-audio channel has been received from the user.

In some implementations, the audio channel is configured to ignore audible input from the user during the session.

In some implementations, the audible output includes a first portion associated with a first voice and a second portion associated with a second voice different than the first voice.

In some implementations, the method further comprises: receiving an indication from the user to end the session; and connecting to a compute device associated with at least one of a live chat or a live agent.

In some implementations, the audio channel is associated with a first compute device, and the at least one non-audio channel is associated with a second compute device different than the first compute device.

In some implementations, the initiating of the request, the repeatedly determining, the causing of the inaudible output, and the causing of the audible output is performed by a first compute device, and the initiating of the request includes calling, via the first compute device, a phone number associated with a second compute device to cause the second compute device to generate the session.

In some implementations, the initiating of the request, the repeatedly determining, the causing of the inaudible output, and the causing of the audible output are performed by a voice assistant device, the method further comprising: receiving, by the voice assistant device, a voice command from the user that includes an indication of the request, the initiating of the request performed automatically in response to the receiving of the voice command.

In some embodiments, a method comprises: receiving a representation of a request from a compute device associated with a user to complete a task including a first step and a second step; causing an audio channel associated with the user to synchronize with at least one non-audio channel associated with the user; sending a first signal to cause a first audible output associated with the first step to be output by the audio channel; repeatedly determining whether a prompt on the at least one non-audio channel has been received from the user; sending a second signal to cause an inaudible output on the audio channel to the user in response to each determination that the prompt on the at least one non-audio channel has not been received from the user; and in response to a determination that the prompt on the at least one non-audio channel has been received from the user: determining whether the prompt is in accordance with the first step, selecting a second audible output associated with the second step based on the determining that the prompt is in accordance with the first step, selecting a third audible output based on the determining that the prompt is not in accordance with the first step, and sending a third signal to cause one of the second audible output or the third audible output to be output on the audio channel.

In some implementations, the prompt is a first prompt, the method further comprising: repeatedly determining whether a second prompt on the at least one non-audio channel has been received from the user; sending a fourth signal to cause the inaudible output on the audio channel to the user in response to each determination that the prompt on the at least one non-audio channel has not been received from the user; and in response to the determination that the second prompt on the at least one non-audio channel has been received from the user: selecting a fourth audible output based on an activity by the user on the at least one non-audio channel, and sending a fourth signal to cause the fourth audible output to be output on the audio channel.

In some implementations, the compute device is a mobile device, further comprising transmitting a hyperlink to the mobile device via at least one of a text message or an email, the causing of the audio channel associated with the user to synchronize with the at least one non-audio channel associated with the user performed automatically in response to the user selecting the hyperlink.

In some implementations, the audio channel is associated with a first device type from a plurality of device types and the at least one non-audio channel is associated with a second device type from the plurality of device types, the plurality of device types includes a phone, a smart speaker, a speaker, an earphone and an Internet of Things (IoT) device.

In some implementations, at least one of the first audible output, the second audible output, or the third audible output include a first portion output in a first language during a first time after the selecting of the audible output, and a second portion output in a second language different than the first language during a second time after the first time.

In some implementations, the compute device is a first compute device, the method further comprising: connecting to a second compute device associated with at least one of a live chat or a live agent in response to an indication from the user to connect with at least one of the live chat of the live agent.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. An apparatus, comprising:
    a processor; and
    a memory operably coupled to the processor, the memory storing instructions to cause the processor to:
        receive an indication of a start of a session associated with a user and having an audio channel that is synchronized with a non-audio channel;
        repeatedly determine, after the receiving, whether a prompt on the non-audio channel has been received from the user; and
        send a signal to cause an inaudible output on the audio channel to the user in response to each determination that the prompt on the non-audio channel has not been received from the user.

2. The apparatus of claim 1, wherein the memory further stores instructions to cause the processor to:

in response to a determination that the prompt on the non-audio channel has been received from the user, select an audible output based on an activity by the user on the non-audio channel;
select, at a first time, a first language from a plurality of languages; and
select, at a second time after the first time, a second language from the plurality of languages,
the selecting the audible output being based on the second language.

3. The apparatus of claim 1, wherein:
the audio channel is associated with a first device type from a plurality of device types,
the non-audio channel is associated with a second device type from the plurality of device types, and
the plurality of device types includes a phone, a smart speaker, an earphone and an Internet of Things (IoT) device.

4. The apparatus of claim 1, wherein the memory further stores instructions to cause the processor to:
in response to a determination that the prompt on the non-audio channel has been received from the user, select an audible output based on an activity by the user on the non-audio channel, and
receive, via an application programming interface (API), a signal from a device for the non-audio channel,
the selecting the audible output being based on the signal from the device for the non-audio channel.

5. The apparatus of claim 1, wherein:
during a first time period, the non-audio channel is associated with and the selecting is performed with respect to a first digital non-audio channel, and
during a second time period after the first time period, the non-audio channel is associated with and the selecting is performed with respect to a second digital non-audio channel different from the first digital non-audio channel.

6. The apparatus of claim 1, wherein the repeatedly determining and the sending the signal to cause the inaudible output being repeated until an end of the session, the method further comprising:
after the start of the session and before the end of the session, performing at least one of:
determine that a prompt on the audio channel received from the user includes an indication that the user would like to discontinue the non-audio channel, or
determine that the prompt on the non-audio channel includes an indication that the user would like to discontinue the non-audio channel;
terminate the non-audio channel of the session, in response to the indication that the user would like to discontinue the non-audio channel; and
send, after the terminating, a signal to connect a communication device of the user with a communication device of a live agent.

7. The apparatus of claim 1, wherein the non-audio channel is associated with a communication device of the user, the communication device of the user having a plurality of output modes.

8. A non-transitory, processor-readable medium storing instructions to cause a processor to:
initiate a request for a session associated with a user to cause an audio channel associated with the session to synchronize with a non-audio channel associated with the session;
repeatedly determine whether a prompt on the non-audio channel has been received from the user; and
cause an inaudible output on the audio channel to the user in response to each determination that the prompt on the non-audio channel has not been received from the user.

9. The non-transitory, processor-readable medium of claim 8, wherein the audio channel is configured to ignore audible input from the user during the session.

10. The non-transitory, processor-readable medium of claim 8, wherein the instructions includes instructions to cause the processor to:
cause an audible output to be output on the audio channel in response to a determination that the prompt on the non-audio channel has been received from the user,
the audible output includes a first portion associated with a first voice and a second portion associated with a second voice different than the first voice.

11. The non-transitory, processor-readable medium of claim 8, wherein the instructions includes instructions to cause the processor to:
receive an indication from the user to end the session; and
connect to a compute device associated with at least one of a live chat or a live agent.

12. The non-transitory, processor-readable medium of claim 8, wherein the audio channel is associated with a first compute device, and the non-audio channel is associated with a second compute device different than the first compute device.

13. The non-transitory, processor-readable medium of claim 8, wherein:
the initiating of the request, the repeatedly determining, and the causing of the inaudible output is performed by a first compute device, and
the initiating of the request includes calling, via the first compute device, a phone number associated with a second compute device to cause the second compute device to generate the session.

14. The non-transitory, processor-readable medium of claim 8, wherein the initiating of the request, the repeatedly determining, and the causing of the inaudible output are performed by a voice assistant device, the instructions includes instructions to cause the processor to:
receive, by the voice assistant device, a voice command from the user that includes an indication of the request, the initiating of the request performed automatically in response to the receiving of the voice command.

15. A non-transitory, processor-readable medium storing instructions to cause a processor to:
receive a representation of a request from a compute device associated with a user to complete a task;
cause an audio channel associated with the user to synchronize with at least one non-audio channel associated with the user;
send a first signal to cause a first audible output to be output by the audio channel;
repeatedly determine whether a prompt on the at least one non-audio channel has been received from the user;
send a second signal to cause an inaudible output on the audio channel to the user in response to each determination that the prompt on the at least one non-audio channel has not been received from the user; and
in response to a determination that the prompt on the at least one non-audio channel has been received from the user:
select a second audible output based on a determination that the prompt is in accordance with the task, select a third audible output based on a determination that the prompt is not in accordance with the task, and send a third signal to cause one of the second audible output or the third audible output to be output on the audio channel.

16. The non-transitory, processor-readable medium of claim 15, wherein the prompt is a first prompt, the instructions further includes instructions to cause the processor to:

repeatedly determine whether a second prompt on the at least one non-audio channel has been received from the user;

send a fourth signal to cause the inaudible output on the audio channel to the user in response to each determination that the second prompt on the at least one non-audio channel has not been received from the user; and in response to the determination that the second prompt on the at least one non-audio channel has been received from the user:

select a fourth audible output based on an activity by the user on the at least one non-audio channel, and send a fourth signal to cause the fourth audible output to be output on the audio channel.

17. The non-transitory, processor-readable medium of claim 15, wherein the compute device is a mobile device, the instructions further including instructions to cause the processor to:

transmit a hyperlink to the mobile device via at least one of a text message or an email, the causing of the audio channel associated with the user to synchronize with the at least one non-audio channel associated with the user performed automatically in response to the user selecting the hyperlink.

18. The non-transitory, processor-readable medium of claim 15, wherein the audio channel is associated with a first device type from a plurality of device types and the at least one non-audio channel is associated with a second device type from the plurality of device types, the plurality of device types includes a phone, a smart speaker, a speaker, an earphone and an Internet of Things (IoT) device.

19. The non-transitory, processor-readable medium of claim 15, wherein at least one of the first audible output, the second audible output, or the third audible output include a first portion output in a first language during a first time, and a second portion output in a second language different than the first language during a second time after the first time.

20. The non-transitory, processor-readable medium of claim 15, wherein the compute device is a first compute device, the instructions further including instructions to cause the processor to:

connect to a second compute device associated with at least one of a live chat or a live agent in response to an indication from the user to connect with at least one of the live chat or the live agent.

* * * * *